United States Patent
Yong et al.

(10) Patent No.: US 8,737,190 B2
(45) Date of Patent: May 27, 2014

(54) METHOD AND SYSTEM FOR COMMUNICATION OF DIFFERENT MODULATION FORMATS FROM A WIRELESS STATION IN A WIRELESS SYSTEM

(75) Inventors: Su-Khiong Yong, Santa Clara, CA (US); Pengfei Xia, Mountain View, CA (US); Chiu Ngo, San Francisco, CA (US)

(73) Assignee: Samsung Electronics Co., Ltd., Suwon (KR)

(*) Notice: Subject to any disclaimer, the term of this patent is extended or adjusted under 35 U.S.C. 154(b) by 422 days.

(21) Appl. No.: 12/540,129

(22) Filed: Aug. 12, 2009

(65) Prior Publication Data

US 2010/0130264 A1 May 27, 2010

Related U.S. Application Data

(60) Provisional application No. 61/117,032, filed on Nov. 21, 2008.

(51) Int. Cl.
*H04J 11/00* (2006.01)

(52) U.S. Cl.
USPC ........... 370/203; 370/318; 455/561; 375/267; 375/347

(58) Field of Classification Search
USPC ......... 370/318, 319, 320, 321, 344, 347, 203, 370/204; 455/101, 102, 129, 561; 375/267, 375/347
See application file for complete search history.

(56) References Cited

U.S. PATENT DOCUMENTS

| | | | |
|---|---|---|---|
| 5,732,337 A | 3/1998 | Wargnier et al. | |
| 5,917,856 A | 6/1999 | Torsti | |
| 6,201,801 B1 | 3/2001 | Dent | |
| 7,136,627 B2 | 11/2006 | Hamalainen et al. | |
| 7,149,199 B2 | 12/2006 | Sung et al. | |
| 7,221,720 B2 | 5/2007 | Robinson | |
| 7,400,614 B2 | 7/2008 | Buehrer et al. | |
| 8,059,730 B2 | 11/2011 | Huang et al. | |
| 8,111,993 B2 | 2/2012 | Lowery et al. | |
| 2006/0120480 A1 | 6/2006 | Klomsdorf et al. | |
| 2008/0019305 A1* | 1/2008 | Dekorsy et al. | 370/329 |
| 2010/0135149 A1 | 6/2010 | Li et al. | |
| 2011/0268224 A1* | 11/2011 | Khojastepour | 375/295 |

OTHER PUBLICATIONS

Performance of MIMO systems with combined polarization multiplexing and transmit diversity by Yu Den et al. Publish in 2005.*

(Continued)

*Primary Examiner* — Dady Chery
(74) *Attorney, Agent, or Firm* — Kenneth L. Sherman, Esq.; Michael Zarrabian, Esq.; Sherman & Zarrabian LLP (57) ABSTRACT

A method and system for wireless communication in a wireless station including a transceiver with multiple antennas, is provided. In one implementation, the wireless station performs multiple modulation communication by multiplexing different signal carrier modulation formats by antenna cross polarization multiplexing, including mapping the modulation formats to multiple antenna cross polarization branches. Communication power is allocated for each polarization branch by selectively distributing power to each of the polarized antennas based on at least one of: application data rate requirements, communication link quality indication (LQI) and delay spread of cross polarized channels. Data is transmitted utilizing the modulation formats simultaneously at the same frequency over multiple cross polarized antennas.

35 Claims, 7 Drawing Sheets

(56) References Cited

OTHER PUBLICATIONS

IEEE Computer Society, "IEEE P802.15.3c/D02 Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension", IEEE, 2008, pp. i-192, New York, United States.

Nabar, R.U. et al., "Performance of Multiantenna Signaling Techniques in the Presence of Polarization Diversity", IEEE Transactions on Signal Processing, vol. 50, No. 10, IEEE, Oct. 2002, pp. 2553-2562, United States.

Schumacher, L. et al., "Simulating polarisation diversity and power allocation in MIMO channels", Proceedings of the Fourth European Mobile Communications Conference (EPMCC 2001), Feb. 20, 2001 to Feb. 22, 2001, Österreichischer Verband für Elektrotechnik (OVE), 2001, pp. 1-5, Vienna, Austria.

Cetiner, B. et al., "A MIMO System with Multifunctional Reconfigurable Antennas", IEEE Antennas and Wireless Propagation Letters (AWPL), IEEE, Dec. 2006, pp. 1-4, United States.

Deng, Y. et al., "Performance of MIMO Systems with Combined Polarization Multiplexing and Transmit Diversity", Proceedings of the IEEE 61st Vehicular Technology Conference (VTC 2005-Spring), IEEE, 2005, pp. 1-5, United States.

U.S. Final Office Action for U.S. Appl. No. 12/552,940 mailed Oct. 16, 2012.

U.S. Advisory Action for U.S. Appl. No. 12/552,940 mailed Dec. 28, 2012.

U.S. Non-Final Office Action for U.S. Appl. No. 12/552,940 mailed Jan. 30, 2013.

U.S. Non-Final Office Action for U.S. Appl. No. 12/552,940 mailed May 29, 2012.

U.S. Final Office Action for U.S. Appl. No. 12/552,940 mailed Jul. 1, 2013.

U.S. Notice of Allowance for U.S. Appl. No. 12/552,940 mailed Feb. 3, 2014.

\* cited by examiner

METHOD AND SYSTEM FOR COMMUNICATION OF DIFFERENT MODULATION FORMATS FROM A WIRELESS STATION IN A WIRELESS SYSTEM

RELATED APPLICATION

This application claims priority from U.S. Provisional Patent Application Ser. No. 61/117,032 filed on Nov. 21, 2008, incorporated herein by reference.

FIELD OF THE INVENTION

The present invention relates in general to wireless communication, and in particular, to wireless communication systems utilizing antenna polarization.

BACKGROUND OF THE INVENTION

In wireless communications, single-carrier (SC) and orthogonal frequency division multiplexing (OFDM) provide two different modulation formats. These formats typically cannot be transmitted from the same wireless station in the same time and frequency band. Conventional wireless standards/systems specify both modulation formats to serve different applications. These two formats somehow must be able to co-exist at the minimum level. Co-existence requirements impose common mode signaling wherein typically SC signals must be transmitted and received by both SC and OFDM wireless stations. However, such an approach for addressing co-existence of more than two modulation formats incurs additional overhead in the wireless network, which in turn reduces the efficiency of the network. This is especially critical to very high data rate applications.

BRIEF SUMMARY OF THE INVENTION

A method and system for wireless communication in a wireless station including a transceiver with multiple antennas, is provided. In one implementation, the wireless station performs multiple modulation communication by multiplexing different signal carrier modulation formats by antenna cross polarization multiplexing, including mapping the modulation formats to multiple antenna cross polarization branches. Transmission power of the communication is allocated for each polarization branch by selectively distributing power to each of the polarized antennas based on at least one of: application data rate requirements, communication link quality indicator (LQI) and channel conditions of the cross polarized channels (e.g., delay spread). Data is transmitted utilizing the modulation formats simultaneously at the same frequency over multiple cross polarized antennas.

These and other features, aspects and advantages of the present invention will become understood with reference to the following description, appended claims and accompanying figures.

DESCRIPTION OF THE INVENTION

The present invention provides a method and system for transmission of different carrier signal modulation formats from the same wireless station in a wireless system. One embodiment provides multiple modulation communication involving multiplexing of different carrier signal modulation formats and strategies for mapping such modulations to polarization branches with power allocation based on the channel conditions (e.g., delay spread) and power received, associated with polarized channels. Channel means the wireless communication medium and, branch means the physical polarized antenna.

Antenna polarization multiplexing enables simultaneous transmission/reception of different modulation formats in a wireless network at the same time, at the same frequency, in close proximity, and without interference. Antenna polarization multiplexing also allows modulation, polarization and power allocation selection. Further, election of transmission mode based on application requirements, link quality indicator (LQI) and channel conditions of the orthogonal polarized channels (e.g., delay spread), provides flexibility and enhanced system performance.

An example implementation of the invention described below comprises a wireless system utilizing multiplexing single-carrier (SC) and orthogonal frequency division multiplexing (OFDM) signals using antenna polarization, modulation and power allocation. This implementation is applicable to wireless systems such as millimeter wave, Wireless Personal Area Network (WPAN), Wireless Local Area Network (WLAN) (e.g., 5 GHz WLAN), and allows two wireless radios with different modulation formats to operate simultaneously using antenna polarization multiplexing. Antenna polarization multiplexing is used to enable simultaneous transmission/reception of two different modulation formats.

The wireless system allows simultaneous transmission/reception of wireless signals (e.g., radio frequency (RF)) using multiple different modulations (e.g., SC and OFDM) at the same time, same frequency and in close proximity in a wireless network. Different wireless stations (STAs) with different functionalities may communicate with an access point (AP). Such different functionalities comprise, e.g., dual-polarized dual mode (DPDM) STA supporting two applications at the same time, dual-polarized single mode (DPSM) STA supporting only one application at a time with polarization diversity, etc. Further, STA-to-STA communication is enabled when one of the STAs is DPDM capable or when both STAs include the same function. STAs with different wireless transceiver architecture options (e.g., DPDM- STA, DPSM-STA and single-polarized single mode (SPSM) STA) can trade-off between performance and complexity.

The wireless system includes two major functions/modules: antenna polarization and power allocation. The antennas V and H comprise the polarization function of antennal polarization. Utilizing antenna polarization, DPDM architecture multiplexes two different modulations for simultaneous transmission/reception at the same time, in the same frequency of the same wireless device. Two multiplexed streams have low susceptibility to crosstalk. Further performance enhancement can be achieved using modulation, power allocation and polarization selection criteria (based on the channel feedback information detailed in FIG. 5, described further below).

Figure 1:
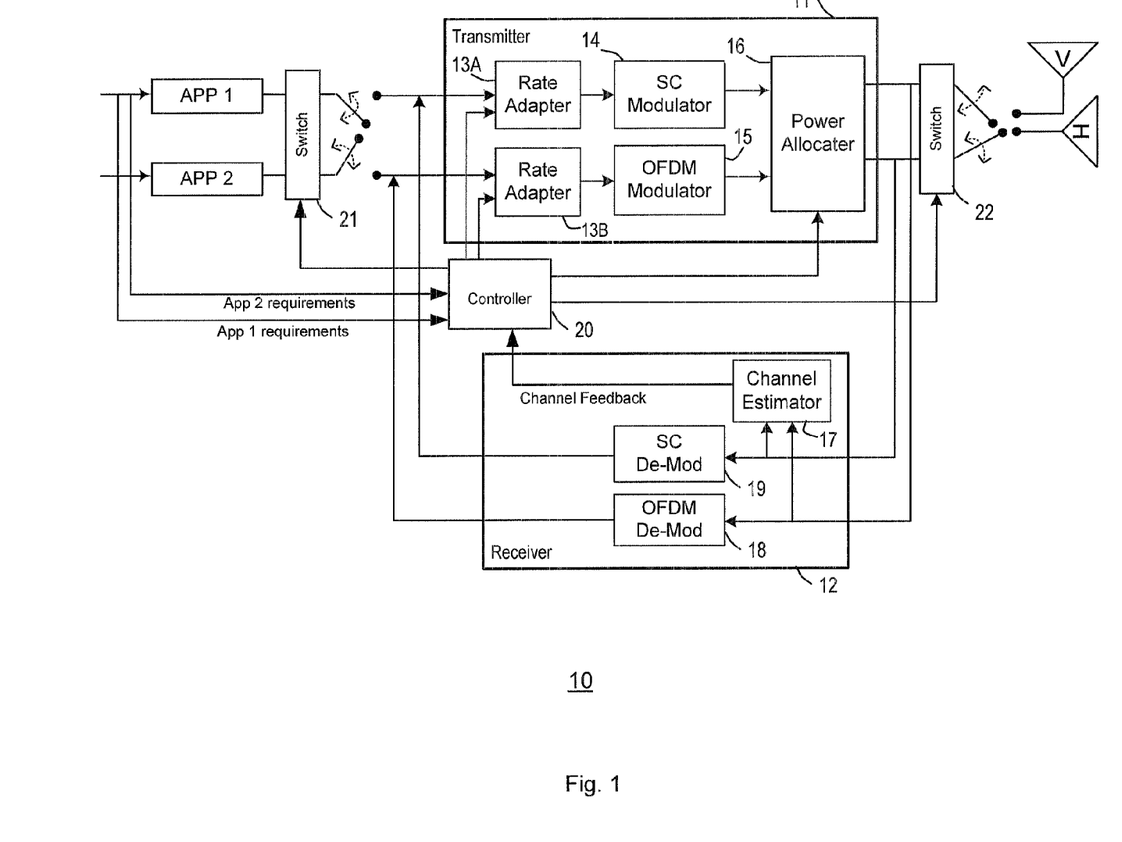
FIG. 1 shows a functional block diagram of a wireless station implementing multiple modulation (multiple modes) communication, according to an embodiment of the invention.

Multiplexing of two different modulation formats involves mapping such modulations to two modulation branches with power allocation based on the delay spread and power received, associated with the two cross polarized channels In FIG. 1, antenna polarization branches are indicated in V and H, respectively. The DPDM architecture can be reduced to DPSM or SPSM by disabling one of the modulation branches and transmitting the other modulation using double or single polarization, respectively. Performance of the DPSM architecture may be improved using polarization diversity or polarization multiplexing. For SPSM architecture, in which only one modulation and one polarization can be used at a time, a particular modulation is assigned to a specific polarization by default (e.g., SC is always sent via H polarization) with unity power and can be switched to other polarization, if required.

The power allocator function is employed in the DPDM and DPSM architectures to distribute power to polarized antennas according to wireless channel conditions, as well as the tolerance of the signal to the channel conditions. The power allocation can also be based on application, wherein data for demanding/high requirement applications (such as video streaming applications which requires a more robust link) is transmitted using more robust polarized branches with more power allocation. Transmissions of data for less demanding/lower requirement applications (such as file downloading which does not require a very robust link), can be transmitted on other branches with less power allocation.

Although the invention is not limited to a specific set of modulation formats, example implementations of the invention using SC and OFDM are now described. FIG. 1 shows an example functional block diagram of a wireless transceiver system 10 for an access point (AP) STA, according to an embodiment of the invention. The system 10 includes a transmitter 11 and a receiver 12 connected to two orthogonal polarized antennas (e.g., vertical V and horizontal H polarizations). The vertical and horizontal polarizations V, H are used for wireless transmission/reception. V and H provide one example implementation. Other implementations such as right hand polarization (RHP) and left hand polarization (LHP) are possible, as described further below. The architecture in FIG. 1 comprises DPDM and is used in an AP wireless station. The DPDM architecture may also be used in a wireless station that affords more complexity and offers more functionality.

The transmitter 11 includes rate adapters 13A-B, an SC modulator 14, an OFDM modulator 15 and a power allocator 16. The receiver 12 includes a channel estimator 17, an SC demodulator 18 and an OFDM demodulator 19. The applications modules APP 1 and APP 2 from an application layer define the type of supported applications. APP 1 and APP 2 serve as variables which can be any application such as video streaming and file downloading applications. Each rate adapter 13A, 13B, changes data rates by changing MCS (modulation and coding schemes) based on the channel information. The SC modulator 14 performs SC modulation (e.g., M-PSK, M-QAM), and the OFDM modulator 15 performs constellation mapping and modulation using orthogonal sub-carriers. The power allocator 16 distributes power to V and/or H branches based on a control signal from a controller 20. Switches 21, 22 perform switching to enable different functions of the transceiver 10.

In the receiver 12, the channel estimator 17 performs channel estimation based on a received channel estimation sequence. The SC demodulator 18 performs the reverse function of the SC modulator 14 (i.e., demodulates the SC signal into data bits). The OFDM demodulator 19 performs the reverse function of the OFDM modulator 15 (i.e., demodulates the OFDM signal into data bits).

An orthogonal polarized antenna system is configured for generating orthogonal polarized signals with low cross talk. The antennas V and H form the physical polarized antenna system. The controller 20 receives information (e.g., application requirements from APP 1, APP 2, and channel feedback from channel estimator 17) and processes such information before sending control information to the switches 21, 22, rate adapters 13A-B and power allocator 16, for configuring an optimum operation of the antenna system.

There are two different polarization multiplexing operations by the controller 20, as follows:
1) Multiplexing of the SC and OFDM, wherein each modulated signal is transmitted to one of the polarization branches for transmission. As an example, SC maps to V branch and OFDM maps to H branch for transmission. In such a case, controller 20 signals the switch 21 to connect to the appropriate modulators path based on the application, and the controller 20 further signals the switch 22 to the appropriate paths to connect to the V and H based on processing on the information received by the controller 20 (such as application requirements, channel feedback, etc.). This is the case when full use of the DPDM is employed.
2) Multiplexing of either of SC or OFDM to both V and H. In such a case, the controller 20 signals the switch 21 to select one of the modulators and switch 22 to both V and H for transmission. Such transmission allows polarization diversity or multiplexing gain to be obtained.

The controller 20 collects various information including channel conditions, LQI, application requirements, and then pre-process the collected information to send appropriate signal to:
1) Rate adapter(s) 13A-B (i.e., at what rate the modulators need to send the data by choosing an appropriate supported MCS);
2) Switches 21 and 22 to map the application to the appropriate modulator and polarized antenna; and
3) Power allocator 16 using an appropriate ratio of the total power allowed to be transmitted by the STA.

When only a single application is used (e.g., APP 1), such antenna system can be configured to exploit polarization diversity by using either SC or OFDM modulation.

Example transceiver architectures for a STA may have three different forms depending on the capability and complexity of the STA. A first STA architecture has similar transceiver architecture as the AP, shown in FIG. 1 and is a DPDM STA. As such, it is not described herein in detail.

Figure 2:
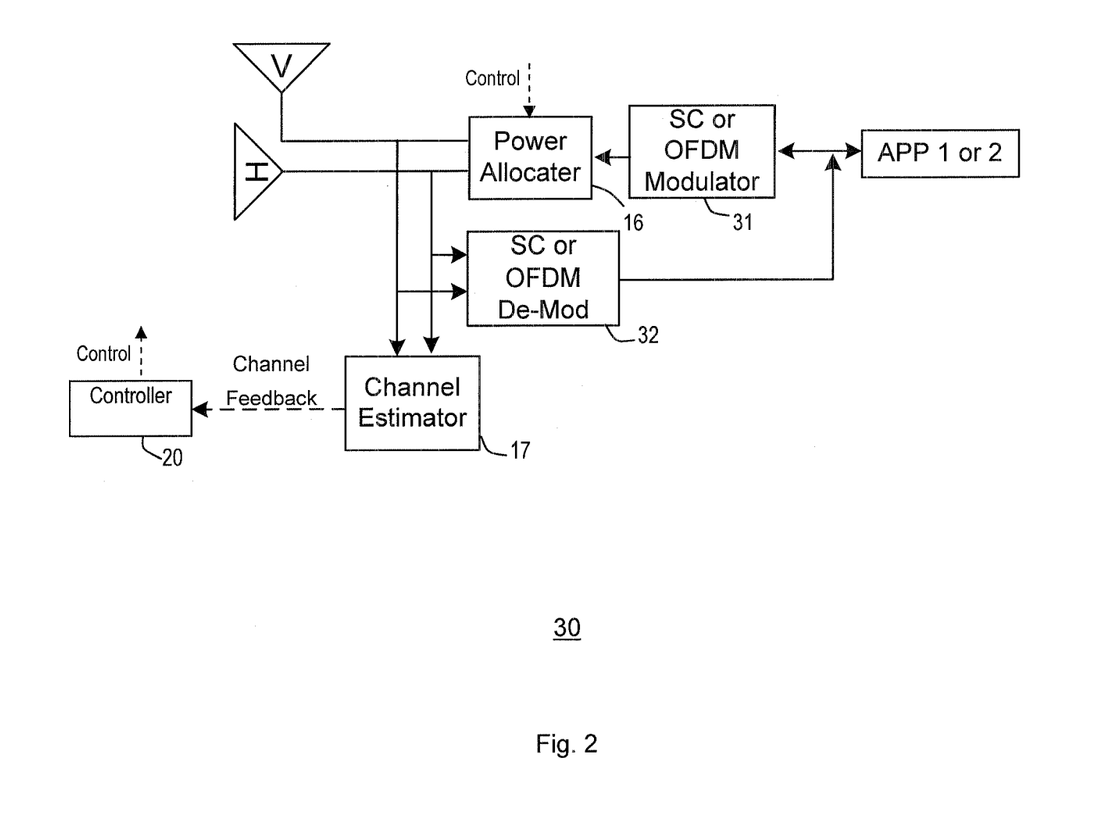
FIG. 2 shows a functional block diagram of a wireless station implementing dual polarization single modulation (single mode) communication, according to an embodiment of the invention.

FIG. 2 shows a functional block diagram of a second STA architecture 30 comprising an application such as APP 1 or APP 2, a modulator 31 (e.g., SC modulator 14 or OFDM modulator 15 in FIG. 1), a power allocator 16, a demodulator 32 (e.g., SC demodulator 18 or OFDM demodulator 19), a channel estimator 17 and a controller 20. The architecture 30 represents a DPSM STA, which utilizes two orthogonal V and H polarizations for transmission and reception of SC or OFDM signals at the same time and in the same frequency. The DPSM STA can be switched to a single stream using one of the polarizations.

Figure 3:
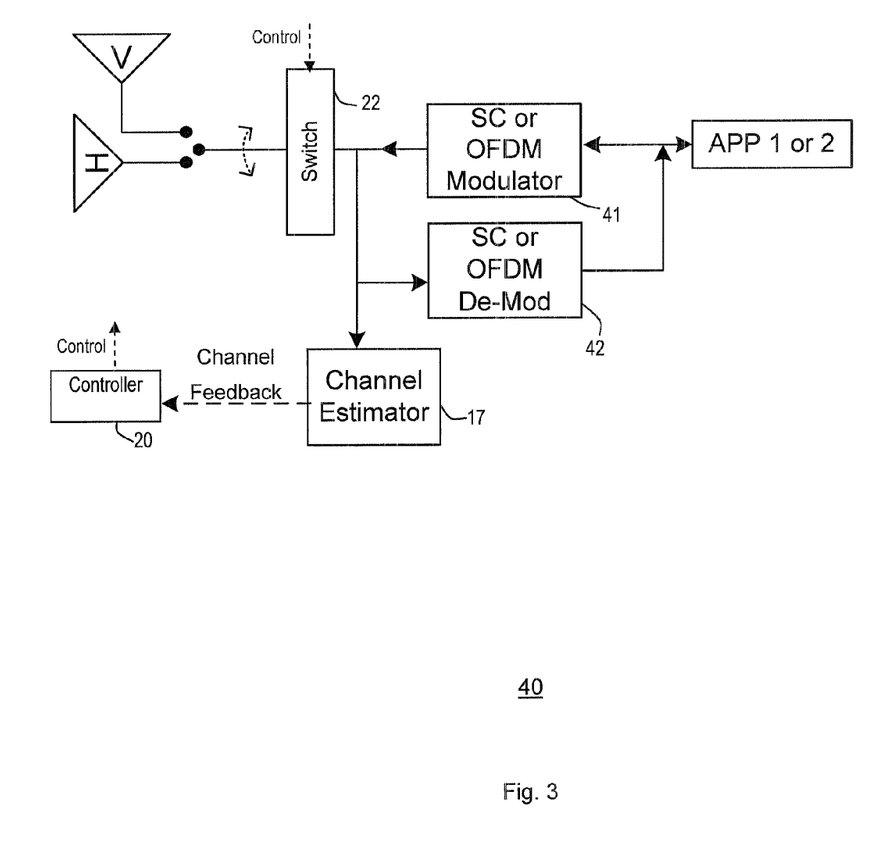
FIG. 3 shows a functional block diagram of a wireless station implementing single polarization single modulation (single mode) communication, according to an embodiment of the invention.

FIG. 3 shows a functional block diagram of a third STA architecture 40 comprising an application such as APP 1 or APP 2, a modulator 41 (e.g., SC modulator 14 or OFDM modulator 15 in FIG. 1), a demodulator 42 (e.g., SC demodulator 18 or OFDM demodulator 19), a channel estimator 17, a switch 22 and a controller 20. The architecture 40 represents a SPSM STA, which based on operation of the switch 22 can only use one of the two orthogonal V and H polarizations for transmission and reception of SC or OFDM signals at a time (i.e., SPSM using SC module or OFDM mode).

Figure 4:
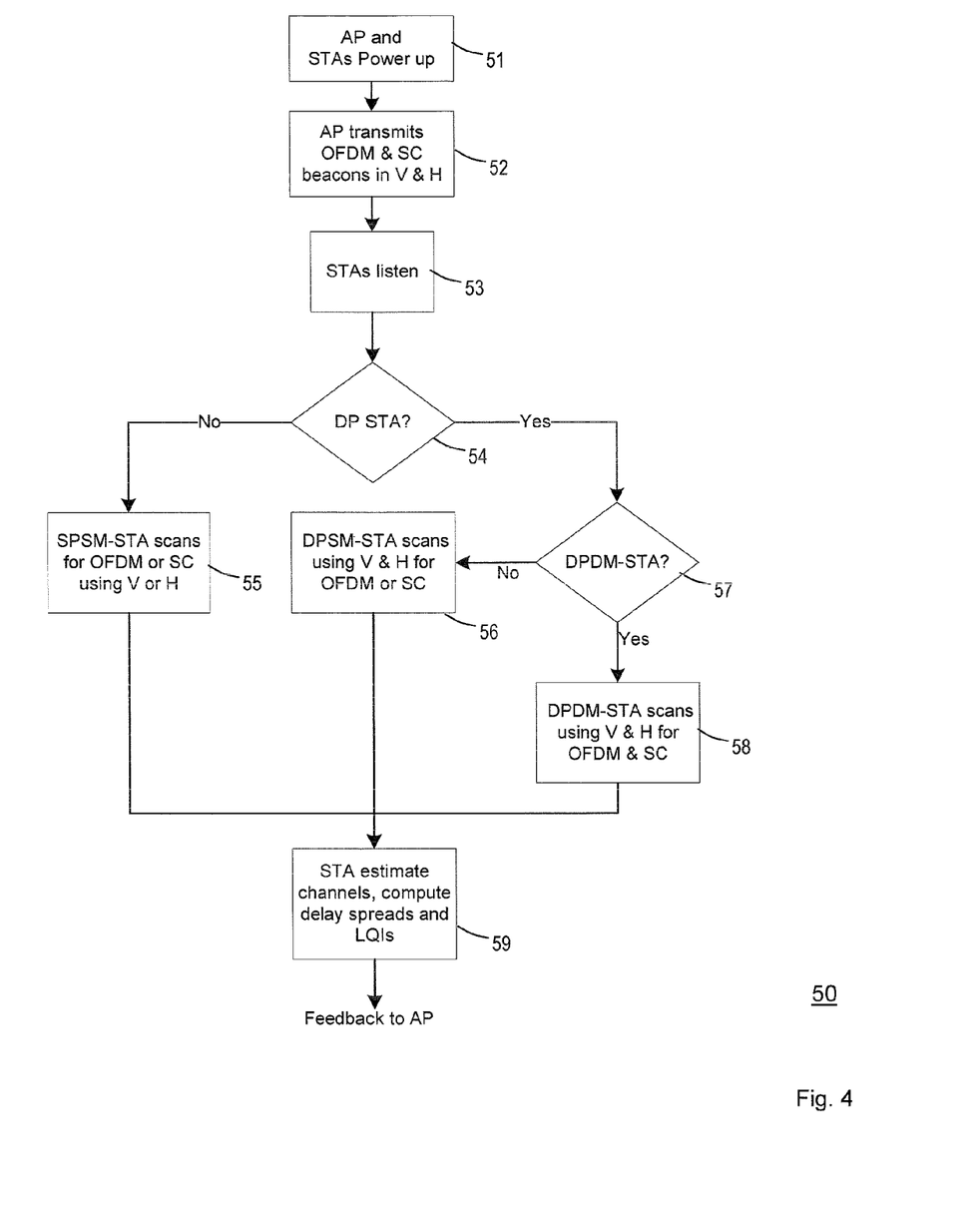
FIG. 4 shows a flowchart of a wireless communication process for discovery and association operations for wireless communication in a network, according to an embodiment of the invention.

FIG. 4 shows a flowchart of a communication process 50 comprising discovery and association operations, according to an embodiment of the invention. When an AP and STAs are powered up (step 51), the AP starts to transmit both SC and OFDM beacons via the H polarization and V polarization, respectively (step 52). All STAs listen (step 53). DPDM-STAs switch SC and OFDM receiver to H and V polarization, respectively.

Upon determining that a STA is a dual-polarized (DP) STA (step 54), if the STA is not a DPDM-STA (step 57) then if it is a DPSM-STA, it uses both the V and H polarizations to listen using a SC or OFDM receiver (step 56), and if a DPDM-STA, it uses both the V and H polarizations to listen using a SC and OFDM receiver (step 58).

Upon determining a STA is not a dual-polarized STA, then as SPSM-STA it switches to H or V polarization depending on whether a SC receiver or an OFDM receiver is used in the SPSM-STA (step 55). Then the STA estimates channel information and feeds back that information to the AP (step 59). In one example, the channel information may include: delay spread of the STAs in V (i.e., $\sigma_V$), delay spread of the STAs in H (i.e., $\sigma_H$), received power at V (i.e., $P_V$), received power at H (i.e., $P_H$), etc.

Figure 5:
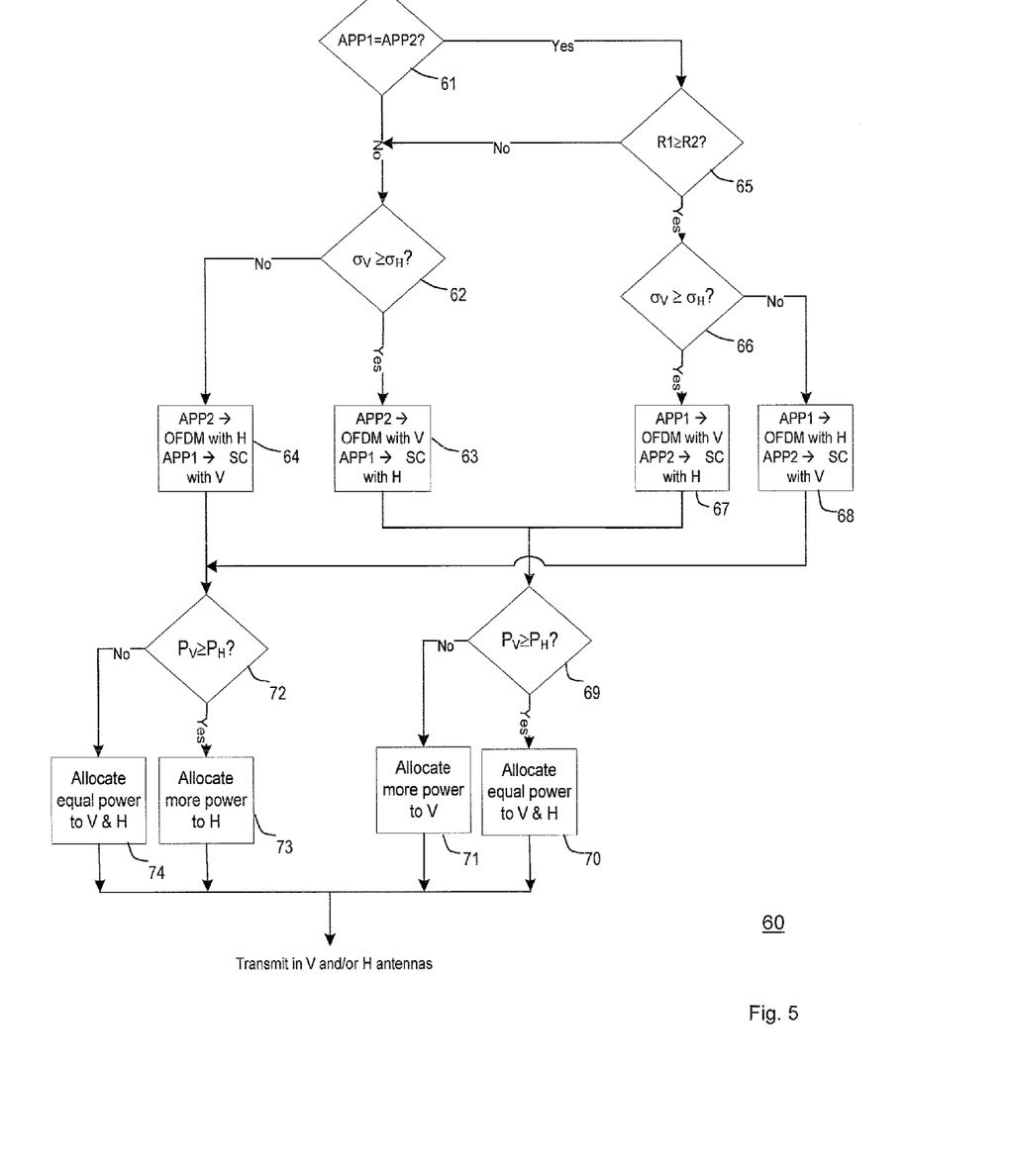
FIG. 5 shows a flowchart of a wireless communication process for modulation, polarization and power allocation selection operations, according to an embodiment of the invention.

FIG. 5 shows a flowchart of a communication process 60 comprising modulation, polarization and power allocation selection operations. Upon receiving all the channel feedbacks from STAs, the AP commences modulation, power allocation and antenna polarization selection. For an AP that serves two simultaneous applications (APP 1 and APP 2) per STA(s) requests, the AP first checks if the two applications fall into a similar category such as video streaming or file transfer (step 61).

If the applications are different (e.g., APP 1 is file transfer and APP 2 is video streaming), the AP checks $\sigma_V$ and $\sigma_H$ of the vertical and horizontal channel (step 62). The AP determines if $\sigma_V \geq \sigma_H$ (step 62). If yes, then APP 1 and APP 2 are mapped to employ SC modulation in H polarization and OFDM modulation in V polarization, respectively (step 63). If $\sigma_V < \sigma_H$, then APP 1 and APP 2 are mapped to employ SC modulation in V polarization and OFDM modulation in H polarization, respectively (step 64).

If however, the AP serves same type applications at the same time (e.g., file transfer or video streaming), then the AP first checks the data rate requirement R1 and R2 of the APP 1 and APP 2, respectively (step 65). If R1≥R2 and σV<σH (step 66) then APP 1 and APP 2 are mapped to employ OFDM modulation in V polarization and SC modulation in H polarization, respectively (step 67). If R1≥R2 and σV<σH, then APP 1 and APP 2 are mapped to employ OFDM modulation in H polarization and SC modulation in V polarization, respectively (step 68).

On the other hand, if R1<R2 and σV≥σH, then APP 1 and APP 2 are mapped to employ SC modulation in H polarization and OFDM modulation in V polarization, respectively (step 63). If R1<R2 and σV<σH, then APP 1 and APP 2 are mapped to employ SC modulation in V polarization and OFDM modulation in H polarization, respectively (step 64).

The process continues with the AP checking the received power at the V and H, PV and PH, respectively. Specifically, for an application employing OFDM modulation in V polarization and SC in H polarization (steps 63 or 67), if PV≥PH (step 69), then equal power allocation is employed for both V and H (step 70), otherwise more power is allocated to the V branch (step 71). For an application employing SC modulation in V polarization and OFDM modulation in H polarization (step 64, 68), if PV≥PH (step 72), then more power is allocated to the H branch (step 73), otherwise equal power allocation is employed to both V and H branches (step 74). Then, AP transmits in the V and/or H antennas accordingly.

Though V and H cross polarizations are used herein as examples of the present invention, other cross polarizations comprising orthogonal polarization signals may also be used. Examples include slanted −45 degree and +45 degree or right hand circularly polarized and left hand circularly polarized. As such, the present invention is not limited to the example V and H cross polarizations provided herein. The controller 20 comprises a processor that implements the process in FIGS. 4 and 5.

Figure 6:
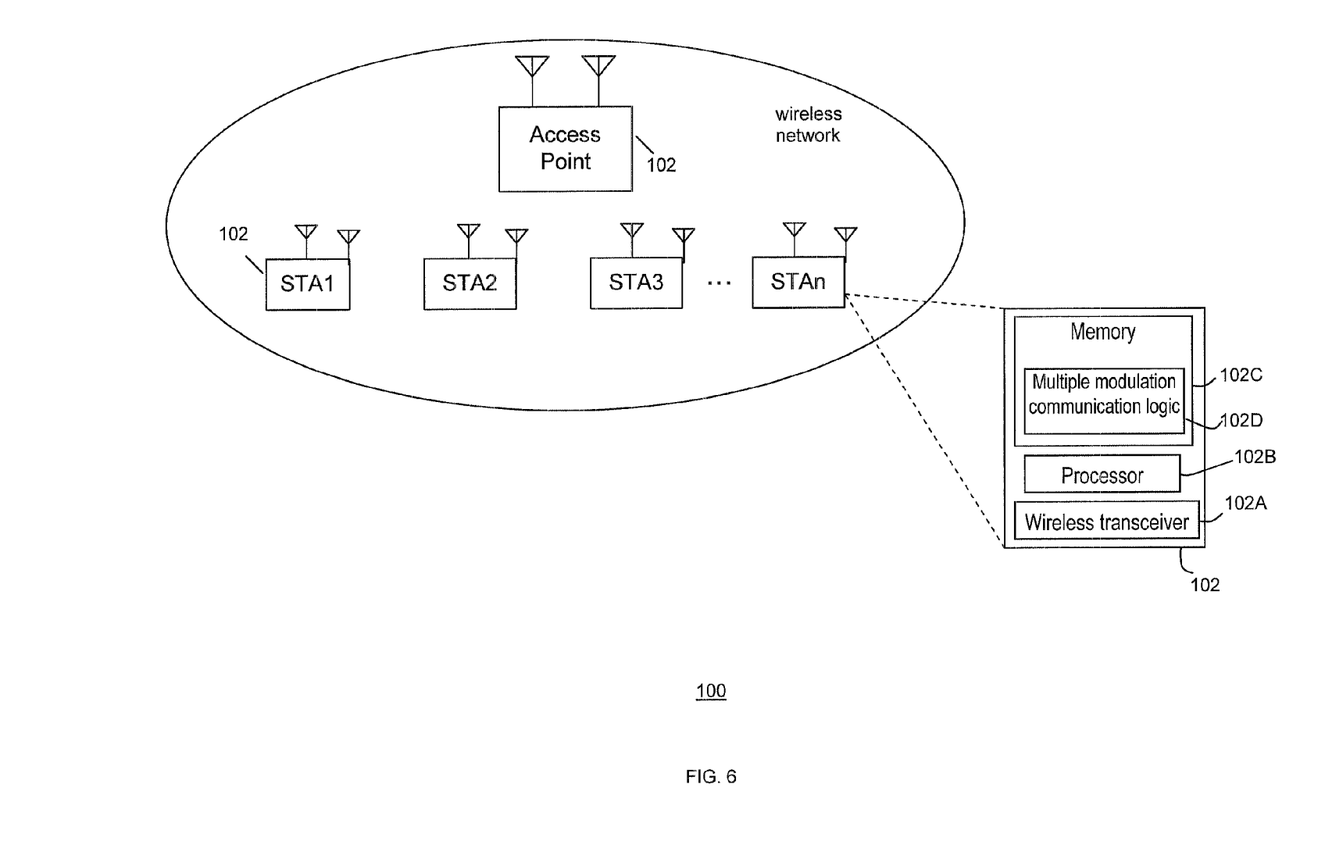
FIG. 6 shows a functional block diagram of a wireless network, according to an embodiment of the invention.

FIG. 6 shows a block diagram of a wireless network 100 which implements an embodiment of the invention. The network 100 comprises multiple wireless stations 102 such as an access point AP and STA1, . . . , STAn. Each wireless station 102 comprises a wireless transceiver 102A, a processor 102B and memory 102C including multiple modulation communication logic 102D described above, according to an embodiment of the invention.

Figure 7:
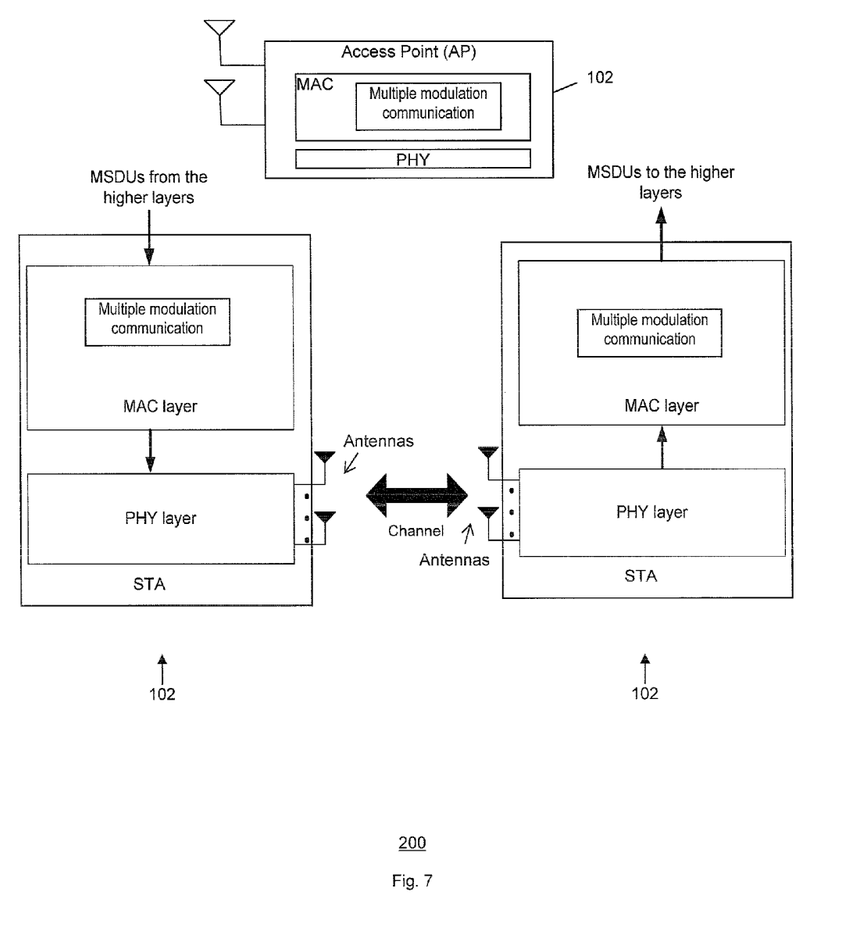
FIG. 7 shows a functional block diagram of another wireless network, according to another embodiment of the invention.

FIG. 7 shows plural wireless stations 102 in an example network 200 where a wireless station functions as an access point (AP) and others as STAs. Each wireless station is capable of transmitting and/or receiving over a wireless channel in a wireless communication system. Each wireless station includes a physical (PHY) layer transceiver and a media access control (MAC) layer configured according to the invention. Frame aggregation may be used in the MAC and PHY layers. For data communication, the MAC layer obtains a MAC Service Data Unit (MSDU) and attaches a MAC header thereto, in order to construct a MAC Protocol Data Unit (MPDU), for transmission. The MAC header includes information such as a source address (SA) and a destination address (DA). The MPDU is a part of a PHY Service Data Unit (PSDU) and is transferred to the PHY layer to attach a PHY header (i.e., PHY preamble) thereto to construct a PHY Protocol Data Unit (PPDU). The PHY header includes parameters for determining a transmission scheme including a coding/modulation scheme. Before transmission as a packet, a preamble is attached to the PPDU, wherein the preamble can include channel estimation and synchronization information.

In one implementation, the PHY layer implements adaptive modulation, antenna polarization, modulation and antenna polarization mapping, power allocation, and channel estimation. The MAC layer implements rate adaptation, scheduling, discovery, modulation and antenna polarization mapping.

The invention provides a system with different classes of STAs to enable different functionalities with low implementation cost and allows the use of compact antenna structures compared to traditional MIMO systems. Modulation, power allocation and antenna polarization selection can be configured to provide sufficient performance for bad channel conditions and specific application requirements, according to the invention. An embodiment of the invention provides two radios (transmitter and receiver in a wireless transceiver station) with different modulation formats (e.g., SC and OFDM) to co-exist and be interoperable without requiring a common mode signaling as typically required in wireless standards such as IEEE 802.15.3c.

The invention enhances network efficiency by allowing simultaneous transmission/reception at the same time, same frequency using the two radios. A discovery mechanism according to the invention is of low complexity, without requiring many multiple antennas at transmitter and/or receiver ends typically used in spatial division multiplexing in order to achieve reasonable performance. The invention is useful with wireless systems such as Wireless Gigabit Alliance (WGA), IEEE 802.11 ad, Next Generation WirelessHD, etc.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information, from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system.

Generally, the term "computer-readable medium", as used herein, refers to any medium that participated in providing instructions to a processor for execution. Such a medium may take many forms, including but not limited to, non-volatile media, volatile media and transmission media. Non-volatile media includes, for example, optical or magnetic disks, such as a storage device. Volatile media includes dynamic memory, such as a main memory. Transmission media includes coaxial cables, copper wire and fiber optics, including the wires that comprise a bus. Transmission media can also take the form of acoustic or light waves, such as those generated during radio wave and infrared data communications.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of wireless communication comprising:
    multiplexing different types of signal carrier modulation formats by antenna cross polarization multiplexing, including mapping the modulation formats to multiple antenna cross polarization branches;
    allocating communication power for each polarization branch by selectively distributing power to each of polarized antenna of a transceiver;
    simultaneously transmitting data utilizing the different types of signal carrier modulation formats at a same frequency and at a same time over multiple cross polarized channels; and
    assigning each different type of signal carrier modulation format to a selected polarization,
    wherein each different type of signal carrier modulation format is assigned to the selected polarization.

2. The method of claim 1 further comprising adaptively changing data rates of the modulation formats by changing modulation and coding schemes (MCS) based on channel information.

3. The method of claim 2 wherein the different types of modulation formats comprise single carrier (SC) modulation and orthogonal frequency division multiplexing (OFDM) modulation.

4. The method of claim 3 wherein the cross polarized channels comprises orthogonal polarized channels, the method further comprising performing discovery and association by:
    upon an access point (AP) and wireless stations (STAs) powering up, the AP transmitting both SC and OFDM beacons via horizontal (H) polarization and vertical (V) polarization, respectively.

5. The method of claim 4, further comprising:
    the STAs listening, such that dual-polarized dual mode STAs (DPDM-STAs) switch a SC and OFDM receiver to H and V polarization, respectively.

6. The method of claim 5, further comprising:
    upon determining that a STA is a dual-polarized (DP) STA, if that STA is not a DPDM-STA, then if the STA is a DP single mode (SM) (DPSM-STA), the STA using both the V and H polarizations to listen using a SC or OFDM receiver, and if the STA is a DPDM-STA, the STA using both the V and H polarizations to listen using a SC and OFDM receiver.

7. The method of claim 6, further comprising:
    upon determining an STA is not a dual-polarized STA, then as a single-polarized single mode STA (SPSM-STA) the STA switching to H or V polarization depending on whether a SC receiver or an OFDM receiver is used in the SPSM-STA, then the STA estimating channel information and feeding back that information to the AP.

8. The method of claim 7, wherein the channel information includes: delay spread of the STAs in V ($\sigma_y$), delay spread of the STAs in H ($\sigma_H$), received power at V ($P_V$), received power at H ($P_H$).

9. The method of claim 1 further comprising mapping the modulation formats to multiple polarization branches with power allocation based on delay spread and power reception associated with the polarized channels.

10. The method of claim 1, wherein assignment to the selected polarization is switched to another polarization if required.

11. The method of claim 10 further comprising:
    different wireless stations performing multiple modulation communication, wherein one wireless station simultaneously supports multiple transmission applications utilizing antenna cross polarization multiplexing, while another wireless station supports one transmission application at a time utilizing polarization diversity.

12. The method of claim 1, wherein a particular modulation is assigned to a specific polarization by default.

13. The method of claim 1, wherein the assignment is switchable to another polarization.

14. The method of claim 1, wherein each modulation format is assigned to the selected polarization with unity power.

15. A wireless station comprising:
    a transceiver;
    a controller that performs multiple modulation communication utilizing the transceiver by multiplexing different types of signal carrier modulation formats by antenna cross polarization multiplexing including mapping the different types of signal carrier modulation formats to multiple antenna cross polarization branches, and assigns each different type of signal carrier modulation format to a selected polarization; and
    a power allocator that allocates communication power for each polarization branch by selectively distributing power to each multiple cross polarized antenna;
    wherein the controller assigns each different type of signal carrier modulation format to the selected polarization with unity power.

16. The wireless station of claim 15 wherein the transceiver comprises rate adapters for adaptively changing data rates of the modulation formats by changing modulation and coding schemes (MCS) based on channel information.

17. The wireless station of claim 16 wherein the transceiver further comprises modulators configured for single carrier (SC) modulation and orthogonal frequency division multiplexing (OFDM) modulation.

18. The wireless station of claim 17 wherein cross polarized channels comprise orthogonal polarized channels.

19. The wireless station of claim 18 wherein the controller maps the modulation formats to multiple polarization branches with power allocation based on delay spread and power reception at the transceiver associated with the cross polarized channels.

20. The wireless station of claim 15 wherein the assignment is switched to another polarization if required.

21. The wireless station of claim 15, wherein selectively distributing power to each of the multiple cross polarized antennas is based on at least one of: application data rate requirements, communication link quality indicator (LQI) and channel conditions of the multiple cross polarized channels.

22. A wireless communication station comprising:
plural wireless stations that communicate over a wireless channel;
each wireless station comprising:
a transceiver;
a controller that performs multiple modulation communication utilizing the transceiver by multiplexing different types of signal carrier modulation formats by antenna cross polarization multiplexing including mapping the different types of signal carrier modulation formats to multiple antenna cross polarization branches, and assigns each different type of signal carrier modulation format to a selected polarization; and
a power allocator that allocates communication power for each polarization branch by selectively distributing power to each multiple cross polarized antenna;
wherein each controller assigns each different type of signal carrier modulation format to the selected polarization with unity power.

23. The wireless communication station of claim 22 wherein each transceiver comprises rate adapters for adaptively changing data rates of the modulation formats by changing modulation and coding schemes (MCS) based on channel information.

24. The wireless communication station of claim 23 wherein each transceiver further comprises modulators configured for single carrier (SC) modulation and orthogonal frequency division multiplexing (OFDM) modulation.

25. The wireless communication station of claim 24 wherein cross polarized channels comprise orthogonal polarized channels.

26. The wireless communication station of claim 22 wherein each controller maps the modulation formats to multiple polarization branches with power allocation based on delay spread and power reception at the corresponding transceiver associated with the cross polarized channels.

27. The wireless communication station of claim 22, wherein the assignment is switched to another polarization if required.

28. The wireless communication station of claim 22 wherein one wireless station simultaneously supports multiple transmission applications utilizing antenna cross polarization multiplexing, while another wireless station supports one transmission application at a time utilizing polarization diversity.

29. The wireless communication station of claim 22 wherein:
a first wireless station is configured for dual-polarized dual mode communication by multiplexing two different modulations for simultaneous transmission/reception at the same time, in the same frequency;
a second wireless station is configured for dual polarized single mode communication by polarization multiplexing; and
a third wireless station is configured for single polarized single mode communication utilizing one modulation format and one polarization.

30. The wireless communication stations of claim 22, wherein a first wireless station and a second wireless station have different modulation formats and are interoperable without requiring a common mode signaling.

31. The wireless communication station of claim 22, wherein selectively distributing power to each of the multiple cross polarized antennas is based on at least one of: application data rate requirements, communication link quality indicator (LQI) and channel conditions of the multiple cross polarized channels.

32. A method of wireless communication comprising: a wireless station including a transceiver with multiple antennas, performing multiple modulation communication, comprising:
multiplexing different types of signal carrier modulation formats by antenna cross polarization multiplexing, including mapping the different types of signal carrier modulation formats to multiple antenna cross polarization branches;
allocating communication power for each polarization branch by selectively distributing power to each multiple cross polarized antenna;
simultaneously transmitting data utilizing the different types of signal carrier modulation formats at the same frequency over multiple cross polarized channels;
assigning each different type of signal carrier modulation format to a selected polarization; and
performing multiple modulation communication by different wireless stations, wherein one wireless station simultaneously supports multiple transmission applications utilizing antenna cross polarization multiplexing, while another wireless station supports one transmission application at a time utilizing polarization diversity.

33. The method of claim 32, wherein selectively distributing power to each polarized antenna of the transceiver is based on at least one of: application data rate requirements, communication link quality indicator (LQI) and channel conditions of the multiple cross polarized channels.

34. The method of claim 33, wherein each modulation format is assigned to the selected polarization with unity power.

35. A wireless station comprising:
a controller that performs multiple modulation communication utilizing a transceiver by multiplexing different types of signal carrier modulation formats by antenna cross polarization multiplexing including mapping the different types of signal carrier modulation formats to multiple antenna cross polarization branches, and assigns each of the different types of signal carrier modulation formats to a selected polarization; and
a power allocator that allocates communication power for each polarization branch by selectively distributing power to each multiple cross polarized antenna;
wherein the controller assigns each different type of signal carrier modulation format to the selected polarization.

* * * * *